UNITED STATES PATENT OFFICE.

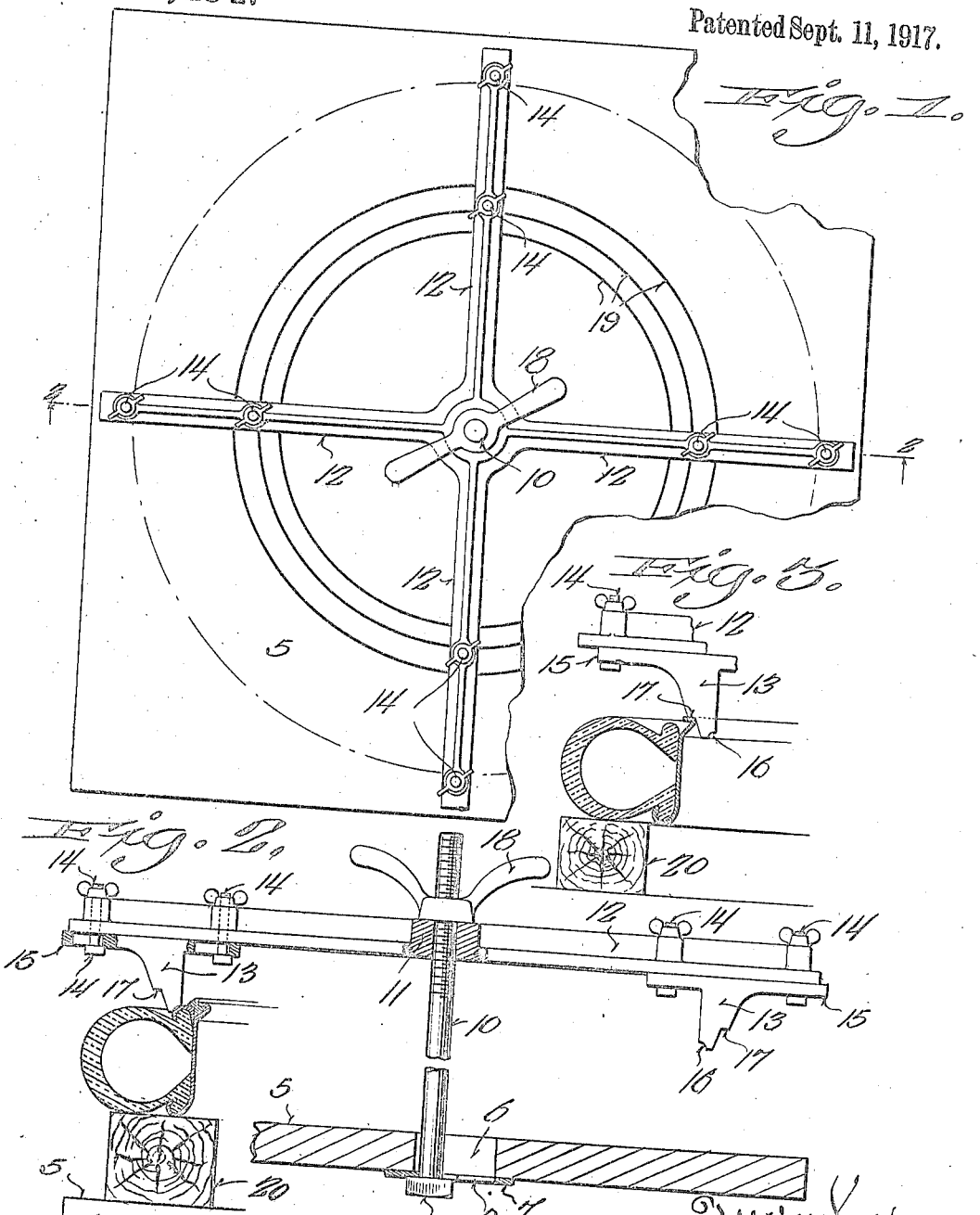

CLARENCE A. BOYD, OF MILWAUKEE, WISCONSIN.

TIRE-REMOVING TOOL.

1,239,454. Specification of Letters Patent. Patented Sept. 11, 1917.

Application filed February 8, 1917. Serial No. 147,332.

*To all whom it may concern:*

Be it known that I, CLARENCE A. BOYD, a citizen of the United States, and resident of Milwaukee, in the county of Milwaukee and State of Wisconsin, have invented certain new and useful Improvements in Tire-Removing Tools; and I do hereby declare that the following is a full, clear, and exact description thereof.

My invention relates to new and useful improvements in tools for removing tires from detachable rims, more particularly of that type including side retaining portions held in place by detachable split rings.

It is in general the object of my invention to simplify the structure and to improve the efficiency of devices of this character.

It is more particularly an object to provide a tire removing device which may be manipulated in a most ready and quick manner.

A still further object resides in the provision of a tire removing device which is readily adjustable to compensate for different sizes of tires.

With the above and other objects and advantages in view, the invention resides more particularly in the novel combination, formation and arrangement of parts hereinafter described and pointed out in the appended claim.

In the drawings:

Figure 1 is a plan view of my improved tire removing device, the portions of the table thereof being broken away.

Fig. 2 is a vertical sectional view through the device on the line 2—2 of Fig. 1.

Fig. 3 is a fragmentary view showing the application of my device in the final operation of removing a tire from a rim and Fig. 4 is a bottom plan view of the key hole plate for detachably securing the tire engaging member of my device to the table.

Referring now more particularly to the accompanying drawings, 5 designates a table or bed surface which is provided centrally with an elongated opening 6 and secured under this opening is a plate 7 provided with a key hole slot 8 adapted to receive through its larger portion the head 9 of a bolt 10 carrying the work engaging member of my device, the bolt being engageable in the reduced portion of the slot to provide an interlocking connection with the table, and the bolt and work engaging portion of my device being thus detachable in a most ready manner to permit the disposal of a tire and rim between the work engaging member and the table, for operation thereupon.

The work engaging member of my device comprises a hub 11 loosely mounted on the bolt 10 and radially extending from this hub are a series of arms 12 each carrying at its outer end a work engaging block 13 which is adjustably connected therewith by bolts 14 passed through the arm and through laterally slotted ears 15 on the block. Each of these blocks is provided at its inner side with a seating shoulder 16 and at its outer side with a second seating shoulder 17. For forcing the work engaging member of my device downwardly upon a tire, the upper portion of the bolt 10 is threaded, and carries a wing nut 18 engageable with the hub 11.

In the operation of my device, a tire is placed on a plurality of blocks 20 seated on the table, and is centered with respect to the reduced end of the key hole slot 9 by means of the relative position of the blocks with respect to one of a plurality of concentric indicating rings 19 on the table. The bolt 10 is then interlockingly connected in the slot, and the blocks adjusted whereby the inner shoulders 16 thereof engage the detachable flange of the rim. The wing nut is then rotated, and the detachable flange forced inwardly to thus permit withdrawal of the usual locking ring. In some instances, the fixed side of the rim is tightly secured to the tire, and resists manual detachment. To procure this detachment of the rim and tire, the blocks 20 are moved outwardly of the rim as shown in Fig. 3, and the work engaging blocks 13 adjusted whereby their outer shoulders 17 seat on the rim. Actuation of the wing nut then forces the rim downwardly between the blocks to procure complete detachment.

While I have shown and described a preferred form of my invention it is obvious that to meet differing conditions of use, various changes and modifications of structure may be resorted to without departing in any manner from the spirit of my invention, or exceeding the scope of the appended claim.

What is claimed:—

A tire removing device comprising a table, shiftable blocks upon the table for supporting a tire and rim, a bolt detachably engaging said table, a hub slidably mounted upon the bolt, radial arms carried by the hub, and detachable blocks secured to the arms having faces adapted to engage respectively the detachable flange and the rim.

In testimony that I claim the foregoing I have hereunto set my hand at Milwaukee, in the county of Milwaukee and State of Wisconsin, in the presence of two witnesses.

CLARENCE A. BOYD.

Witnesses:
FRANK L. RATCLIFFE,
M. E. DOWNEY.